3,098,749
SWEETENING AGENT AND PROCESS OF PRODUCING THE SAME
Fred J. Helgren, Waukegan, Ill., assignor to Abbott Laboratories, Chicago, Ill., a corporation of Illinois
No Drawing. Filed Nov. 16, 1960, Ser. No. 69,560
10 Claims. (Cl. 99—141)

This invention relates to sweetening compositions and more particularly to a composition comprising an edible salt of cyclamate and an edible salt of saccharin.

The synthetic sweetening agents have always had an important place in the diet of persons who must necessarily restrict their intake of sugar, such as diabetics. More recently, a much larger group of people have become conscious of the synthetic sweeteners as more and more emphasis is placed on low-calorie diets for obese and overweight persons. Two synthetic sweeteners which have achieved the greatest degree of acceptance are cyclamate and saccharin which are both recognized as being harmless in usual amounts.

In my earlier patent, U.S. 2,803,551, it has been demonstrated that the most acceptable artificial sweetening composition comprises from about 6–67% by weight of a physiologically acceptable salt of cyclamate, and from about 0.6–6.7% by weight of a physiologically acceptable salt of saccharin. This, expressed differently, means 1–10 parts of saccharin to 100 parts of cyclamate. Such a composition has a very pleasant, clean, sweet taste without off-taste or after-taste which may be perceived by a large percentage of the consumers who would get such an off-taste or after-taste perception by the use of a cyclamate salt alone or a saccharin salt alone.

However, the prior art combinations of physiologically acceptable salts of cyclamate and saccharin have some serious disadvantages for the manufacturer and/or the user. For instance, when the above-mentioned physiological salts are mixed in powder form, the mixture of the two components has poor flowability and is dusty. The unfavorable flowing characteristic, the dusting, and the gumming experienced in dissolving the powdered mixture, could be overcome by granulating the two components separately; but in a mixture of such granules, uniform distribution of both saccharin salt and cyclamate salt is not insured and upon storage or transportation, higher concentrations of one or the other component may occur in certain areas of the bulk mixture. Furthermore, to produce acceptable granules according to the prior art, a foreign material is always introduced as a granulating agent, thus increasing the bulk of the composition and introducing a new component into the mixture that might not always be desirable to have present in an edible composition. In addition, such a granulating agent very often leaves some non-dissolving residue which is extremely objectionable for sweetening compositions which are added to hot or cold liquids intended for ingestion.

It is, therefore, an object of the present invention to produce an artificial sweetening composition free of granulating agents. It is another object of the present invention to provide a dust-free, free-flowing, readily soluble sweetening composition. A still further object is the provision of a composition which is readily soluble in hot or cold liquids intended for ingestion, with uniform distribution of all sweetening components throughout the composition. A further object is the provision of a method to produce a sweetening composition containing physiologically acceptable salts of cyclamate and physiologically acceptable salts of saccharin with insured uniform distribution throughout such sweetening composition and free of danger of non-uniformities occurring within such composition during handling and storage.

These and other objects are accomplished by granulating a physiologically acceptable salt of cyclamate with a water-soluble, easily volatilizing liquid containing dissolved therein a physiologically acceptable salt of saccharin. The amounts of the two salts are preferably selected within the uproportions of 5–20 parts of saccharin salt per 100 parts of cyclamate salt, but mixtures containing higher proportions of saccharin salts are also acceptable. As water-soluble, easily volatilizing liquid, acetone or various lower boiling alcohols are useful, e.g. the various ethanols denatured with a low-boiling additive (i.e. 3A or 23A alcohol), methanol, isopropanol, propanol, etc. Water may be used in part of such a liquid but water alone will not produce a satisfactory granulation due to stickiness occurring in the mixing process. Thus, for practical reasons, the granulating liquid is limited to a content of less than 50% water.

Compositions obtained in this manner are free of dusting due to the granulated form, and flow easily without leaving a powdered residue on flasks, funnels, bottle necks, container covers, etc. The granules also dissolve without any difficulty in water or other liquids in which the two physiologically acceptable salts are soluble, whether the granules are added to the liquid or the liquid is added to the granules. In contrast thereto, a liquid, e.g. water, added to a mixture of cyclamate and saccharin salts containing certain granulating agents will cause gumming.

Aside from the aforementioned great advantages of the new composition, the new granules are of lowest possible bulk due to the absence of a granulating agent. For this reason, the granules dissolve readily without leaving even a trace of a non-dissolving residue. Obviously, even more rapid dissolution can be assured by mixing physiologically acceptable carbonates and/or detergent into the granules by adding such an additive to the dry cyclamate salt powder or dissolving such additives in the granulating medium containing the saccharin salt before the mixture is granulated. Furthermore, the absence of a granulating agent makes the sweetness of the granules much more pleasant and the composition is better digestible due to its lower bulk and the absence of a non-digestible additive. A further advantage offered to the consumer of such a granulated artificial sweetening composition is a psychological one, i.e., the consumer may use this granulation in place of granulated cane sugar without having to resort to a sweetener that has a totally artificial appearance. The granules may be used in an ordinary sprinkle-top sugar container and similar devices. In addition, the compositions of this invention are for obvious reasons more economical and sweeter per weight unit than those containing granulating agents.

The present invention is better understood by reference to the following examples which are meant to be illustrations only and not intended to limit the invention in any form except as specified by the appended claims.

Example 1

100 g. of calcium cyclohexylsulfamate are granulated with a solution of 10.0 g. of saccharin calcium in 20 ml. of distilled water and 20 ml. of acetone. The mixture is triturated by hand with mortar and pestle in about 1–2 minutes. After this period, the homogeneous mixture is passed through a 20-mesh screen and the resulting granules are spread on a tray, and dried at 40° C. After drying is complete, the granules are passed through a 20-mesh screen and are ready to be used in a sprinkle-top dispenser. They have a very sweet, clean taste without off-taste or after-taste even for people who normally are sensitive to saccharin or cyclamate salts.

Example 2

The process of Example 1 is repeated with the following slightly different proportions:

100 g. calcium cyclohexylsulfamate
20 g. saccharin calcium
22 ml. distilled water
22 ml. acetone The same easy-flowing granulation is obtained as in Example 1.

Examples 3–9

These examples are carried out in analogy to Example 1 with the indicated modifications pertaining to proportions and solvents used. All these examples produce white, easy-flowing, odorless, clean and sweet granules similar to the above examples.

| | Cyclohexyl-sulfamate amount, cation | Saccharin amount, cation | Solvent system |
|---|---|---|---|
| 3 | 100 g.; Ca | 5 g.; Ca | 20 ml. $H_2O$; 20 ml. acetone. |
| 4 | 100 g.; Na | 10 g.; Na | 20 ml. $H_2O$; 20 ml. acetone. |
| 5 | 100 g.; Na | 10 g.; Ca | 20 ml. $H_2O$; 20 ml. acetone. |
| 6 | 100 g.; Na | 20 g.; Na | 20 ml. $H_2O$; 20 ml. acetone. |
| 7 | 100 g.; Na | 5 g.; Ca | 20 ml. $H_2O$; 20 ml. acetone. |
| 8 | 100 g.; Ca | 10 g.; Ca | 80 ml. 3A alcohol. |
| 9 | 100 g.; Ca | 10 g.; Ca | 80 ml. 23A alcohol. |

In contrast to the above examples, the following example operates outside the solvent limitations specified above and is added only to show the non-operativeness of such proportions.

Example 10

100 g. of calcium cyclohexylsulfamate is granulated with 10 g. of saccharin calcium dissolved in 30 ml. of water and 10 ml. of acetone. When this mixture is triturated to get uniform distribution of the liquid containing the saccharin, the mass becomes sticky. The stickiness makes the mass harder to handle and produces granules which are too hard and too large. If these large granules are broken up by grinding or sifting, much powder is produced and the two ingredients are no longer held together in homogeneous granules.

As shown above, the water-soluble, easily volatilizing solvent may be used alone or in admixture with not more than an equal part of water. A mixture of acetone and water in a ratio of 1:1 makes a very good menstruum. The proportion of acetone can be increased above this ratio without any detrimental effect, although no advantage is seen in adding to the cost of the granulation by increasing the proportion of the less economical organic liquid. The total amount of this liquid is best selected within the range of from 40 to 100 parts per 100 parts of cyclamate salt.

The above examples demonstrate the proportions useful for manufacturing the new granules of the present invention. For convenience, these examples are shown in laboratory proportions but the process of preparing the granulations of the present invention can easily be adapted to large scale batchwise or continuous processes. On a commercial scale, any mixing device can be used for granulating the above specified mixture, as long as such a mixing device agitates all of the mixture, e.g. a Pony mixer, a dough mixer, or similar commercially available mixing apparatuses.

The granules which are subject to the present invention distinguish over previously available artificial sweetening compositions in that they are fine, homogeneous, white, sugarlike, granulated combinations of saccharin and cyclamate salts which have good flowability, which do not clump, which do not adhere to container walls, do not dust, and dissolve in hot or cold liquids without leaving any residue.

Others may practice the invention in any of the numerous ways which will be suggested to one skilled in the art by the present disclosure. All such practice of the invention is considered to be a part hereof provided it falls within the scope of the appended claims.

I claim:

1. In the process of granulating an artificial sweetening composition, the improvement comprising the step of triturating 100 parts of a physiologically acceptable salt of cyclohexylsulfamate with 5–20 parts of a physiologically acceptable salt of saccharin dissolved in 40–100 parts of a liquid, said liquid comprising 50–100% of a water-soluble, easily volatilizing organic solvent and 50–0% of water.

2. The process of claim 1 wherein said physiologically acceptable salt of cyclohexylsulfamate is the calcium salt.

3. The process of claim 1 wherein said physiologically acceptable salt of cyclohexysulfamate is the sodium salt.

4. The process of claim 1 wherein the physiologically acceptable saccharin salt is saccharin calcium.

5. The process of claim 1 wherein the physiologically acceptable saccharin salt is saccharin sodium.

6. The process of claim 1 wherein said liquid contains 25–50% of water.

7. The process of claim 1 wherein said water-soluble, easily volatilizing organic solvent is acetone.

8. The process of claim 1 wherein said water-soluble, easily volatilizing organic solvent is ethyl alcohol.

9. The process of granulating an artificial sweetening composition comprising the steps of triturating 100 parts of a physiologically acceptable salt of cyclohexylsulfamate with 5–20 parts of a physiologically acceptable salt of saccharin dissolved in 40–100 parts of a liquid, said liquid comprising 50–100% of a water-soluble, easily volatilizing organic solvent and 50–0% of water; passing said triturated mixture through a screen; and drying said granulated mixture.

10. A granulated composition comprising 5–20 parts of a physiologically acceptable salt of saccharin for each 100 parts of a physiologically acceptable salt of cyclohexylsulfamate, free of any granulating agent, when prepared according to the method of claim 1.

References Cited in the file of this patent

UNITED STATES PATENTS 2,803,551  Helgren _____ Aug. 20, 1957

OTHER REFERENCES

"Manufacturing of Compressed Tablets," by Silver et al., copyright, 1944, F. J. Stokes Machine Co., page 14. (Copy in Div. 63.)